F. M. STAFFORD.
ANIMAL MEDICATOR.
APPLICATION FILED JULY 22, 1915.
1,173,753.
Patented Feb. 29, 1916.
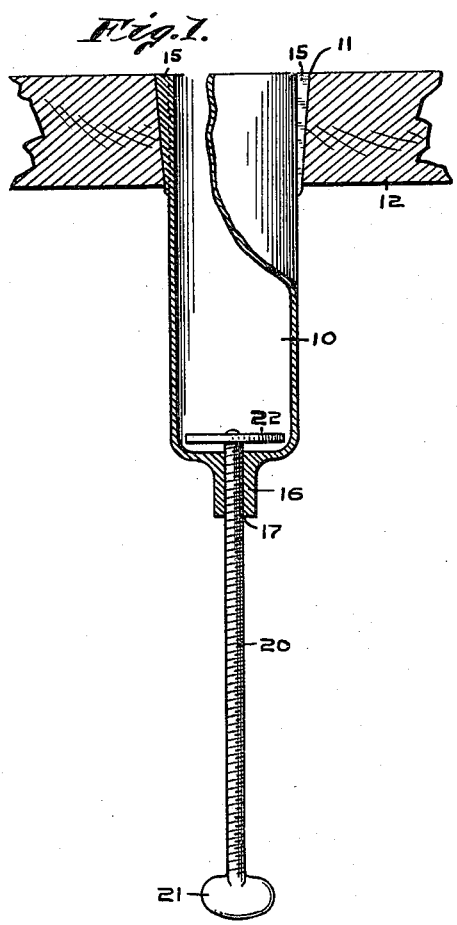
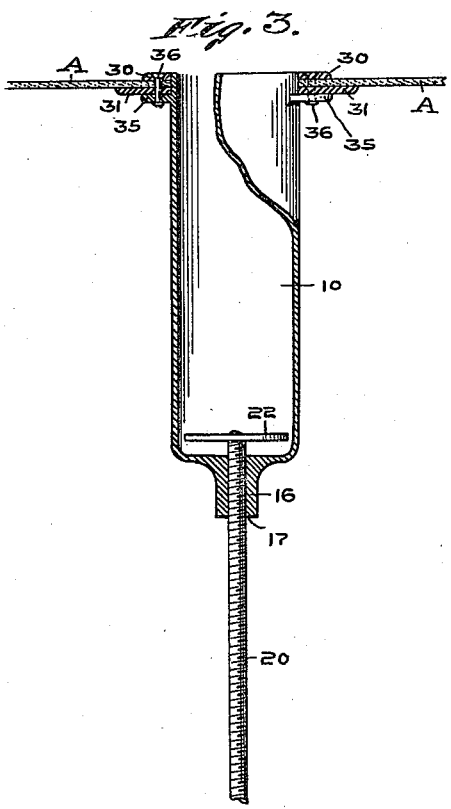
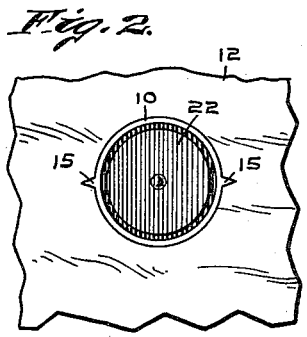
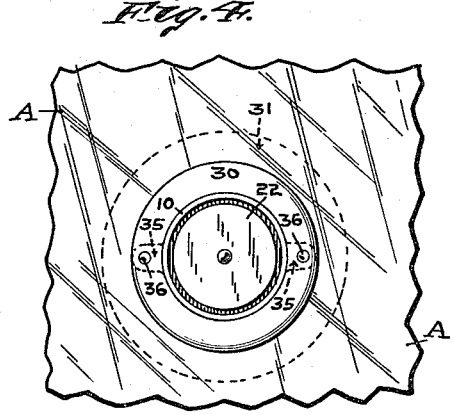
WITNESSES:
L. B. Woerner.
Wm Hurte.
INVENTOR
Francis M. Stafford,
By Minturn & Woerner,
ATTORNEYS.

UNITED STATES PATENT OFFICE.

FRANCIS M. STAFFORD, OF INDIANAPOLIS, INDIANA.

ANIMAL-MEDICATOR.

1,173,753.   Specification of Letters Patent.   Patented Feb. 29, 1916.

Application filed July 22, 1915. Serial No. 41,389.

*To all whom it may concern:*

Be it known that I, FRANCIS M. STAFFORD, a citizen of the United States, residing at Indianapolis, in the county of Marion and State of Indiana, have invented certain new and useful Improvements in Animal-Medicators, of which the following is a specification.

This invention relates to a device for dispensing medicinal substances, in cake and powder form, to animals during the time of feeding; and the object of the invention is to provide a device of the above character adapted to be arranged in the bottom of the feed troughs for animals whereby any substance, in cake and powder form having medicinal properties, can be dispensed to animals during the time they are feeding.

A further object of the invention is to provide means whereby substances having medicinal properties can be fed in graduated amounts to animals when they are feeding.

I accomplish the objects of the invention by means of the device illustrated in the accompanying drawings, forming a part hereof, in which—

Figure 1 is a partial longitudinal sectional view of one of the devices forming the subject-matter of my invention. Fig. 2 is a top or plan view of the construction shown in Fig. 1. Fig. 3 is a view similar to Fig. 1 except showing in modified form the means for securing the device to a canvas feed-box. Fig. 4 is a top or plan view of the construction shown in Fig. 3.

Referring to the drawings, 10 represents a hollow barrel which forms a receptacle for holding the medicinal substance to be dispensed, said barrel adapted to be projected through an aperture 11 in the bottom 12 of the feed-box until the upper edge of the barrel stands flush with the top surface of the bottom 12. The barrel 10 is provided on its opposite exterior surface with the integral ribs 15 which extend from the upper edge downward some distance longitudinally of the barrel. These ribs enter the wood composing the bottom 12 adjacent the aperture 11 when the barrel is driven home and prevents the latter from turning when the bar 20 is rotated. The lower end of the barrel 10 is closed and terminates in a boss 16 having a longitudinal threaded aperture 17 adapted to receive a threaded bar 20 which terminates in a wing 21, to enable the bar 20 to be rotated by the operator's fingers, whereby said bar may be projected longitudinally into the hollow portion of the barrel for gradually forcing the substance to be dispensed from the barrel, and also for retracting the bar 20. In order to more effectively enforce the movement of the substance toward the discharge end of the barrel 10, the end of the bar 20 within the barrrel is provided with a disk 22 having a diameter slightly less than the internal diameter of the barrel. With the hereinbefore mentioned device any substance with medicinal properties can be dispensed by giving the bar 20 a partial or whole turn which will have a tendency to move the bar farther into the barrel and will move the mass of substance until the top of said substance will extend slightly above the surface of the bottom 12, and while the animal is in the act of consuming its feed and licking the surface of the bottom 12, as it is customary for it to do, a sufficient amount of the substance will be removed from the top of the mass to thoroughly medicate the food consumed.

Fig. 3 illustrates a modified form of fastening device for securing the barrel to a canvas feed-box, many of which are now in common use. To enable the barrel to be held securely in position in a feed box composed of canvas, the barrel is projected through a hole in the bottom A of the fabric. A ring 30 surrounds the discharge end of the barrel and overlies the fabric surrounding the hole. Immediately below the fabric A I surround the barrel with a second ring 31 which has a greater diameter than the upper ring, the two rings and fabric A being supported by the barrel through a pair of integral ears 35. Rivets 36 pass through the ears, rings and fabric A to hold all of the parts in place, the rings adding rigidity to the fabric adjacent to the barrel.

Having thus fully described my said invention, what I desire to secure by Letters Patent, is—

1. In combination with an animal feed-box, a dispenser comprising a hollow cylindrical medicinal-agent retaining barrel, a longitudinally extending rib on the exterior surface of said barrel adapted to engage the box and resist rotational movement of the barrel, and means for forcing the medicinal-agent toward the discharge end of the barrel.

2. In combination with an animal feed-box, a dispenser comprising a hollow cylindrical medicinal-agent retaining barrel, a threaded bar passing through a threaded aperture in the closed end of said barrel, a disk on the end of said bar for supporting the medicinal-agent, and a longitudinally extending rib on the exterior surface of said barrel adapted to engage the box and resist rotational movement of said barrel independently of said feed-box.

In witness whereof, I have hereunto set my hand and seal at Indianapolis, Indiana, this 14th day of July, A. D. one thousand nine hundred and fifteen.

FRANCIS M. STAFFORD. [L. S.]

Witnesses:
F. W. WOERNER,
J. A. MINTURN.

Copies of this patent may be obtained for five cents each, by addressing the "Commissioner of Patents, Washington, D. C."